United States Patent
Tanaka

(10) Patent No.: US 12,341,404 B2
(45) Date of Patent: Jun. 24, 2025

(54) COMPRESSOR

(71) Applicant: FUJITSU GENERAL LIMITED, Kanagawa (JP)

(72) Inventor: Hiroaki Tanaka, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 321 days.

(21) Appl. No.: 17/914,447

(22) PCT Filed: Sep. 30, 2020

(86) PCT No.: PCT/JP2020/037227
§ 371 (c)(1),
(2) Date: Sep. 26, 2022

(87) PCT Pub. No.: WO2021/199464
PCT Pub. Date: Oct. 7, 2021

(65) Prior Publication Data
US 2023/0117117 A1    Apr. 20, 2023

(30) Foreign Application Priority Data
Mar. 31, 2020 (JP) .................... 2020-064457

(51) Int. Cl.
*H02K 7/04* (2006.01)
*F25B 31/02* (2006.01)
*H02K 1/276* (2022.01)

(52) U.S. Cl.
CPC ............ *H02K 7/04* (2013.01); *F25B 31/026* (2013.01); *H02K 1/276* (2013.01)

(58) Field of Classification Search
CPC ........ H02K 1/276; H02K 7/04; H02K 15/165; F25B 31/026; F04C 29/00
See application file for complete search history.

(56) References Cited

U.S. PATENT DOCUMENTS

| | | | |
|---|---|---|---|
| 5,666,015 A * | 9/1997 | Uchibori | H02K 1/276 310/156.53 |
| 2012/0057999 A1 | 3/2012 | Fukasaku et al. | |

(Continued)

FOREIGN PATENT DOCUMENTS

| | | |
|---|---|---|
| CN | 103795162 | 5/2014 |
| CN | 107431394 | 12/2017 |

(Continued)

OTHER PUBLICATIONS

International Search Report issued in International Patent Application No. PCT/JP2020/037227, dated Dec. 22, 2020, along with an English translation thereof.

(Continued)

*Primary Examiner* — Mohamad A Musleh
(74) *Attorney, Agent, or Firm* — GREENBLUM & BERNSTEIN, P.L.C.

(57) ABSTRACT

A compressor includes a shaft that is arranged along a rotation axis a compression unit that drives along with rotation of the shaft, a rotor core that is fixed to the shaft, a plurality of permanent magnets that are embedded inside the rotor core, and a stator that causes the rotor core to rotate about the rotation axis, wherein a plurality of eccentric holes for adjusting balance when the shaft rotates are formed in the rotor core, and the plurality of eccentric holes are formed on an inner side of the polygonal region for which midpoints of sides at a side of the rotation axis among sides formed by side surfaces of the plurality of permanent magnet in a cross section perpendicular to the rotation axis serve as vertices.

9 Claims, 9 Drawing Sheets

(56) References Cited

U.S. PATENT DOCUMENTS

2016/0329784 A1 11/2016 Tamura et al.
2018/0031280 A1 2/2018 Kobayashi et al.
2018/0048209 A1 2/2018 Baba

FOREIGN PATENT DOCUMENTS

| | | |
|---|---|---|
| JP | 1-58259 | 4/1989 |
| JP | 4-112652 | 4/1992 |
| JP | 9-308152 | 11/1997 |
| JP | 2000-197292 | 7/2000 |
| JP | 2003-219616 | 7/2003 |
| JP | 2012-57500 | 3/2012 |
| JP | 2015-192592 | 11/2015 |
| JP | 2018-17201 | 2/2018 |
| KR | 10-0825088 | 4/2008 |
| WO | 2015/125254 | 8/2015 |

OTHER PUBLICATIONS

Notice of Reasons for Refusal (Office Action) issued in Japanese Counterpart Patent Appl. No. 2020-064457, dated Jun. 8, 2021, along with an English translation thereof.
Notice of Reasons for Refusal (Office Action) issued in Japanese Counterpart Patent Appl. No. 2020-064457, dated Dec. 3, 2021, along with an English translation thereof.
Official Communication in Chinese patent application No. 202080099131.3 dated Oct. 17, 2024, along with English translation thereof.

\* cited by examiner

COMPRESSOR

FIELD

The present invention relates to a compressor.

BACKGROUND

A compressor in which a motor is mounted and an eccentric hole is formed in a rotor core of a rotor of the motor to reduce eccentricity of a rotating body that is arranged in a compression mechanism to thereby prevent a defect, such as vibration, due to the eccentricity of the rotating body is known (Patent Literatures 1 to 3). The compressor as described above does not include a balance weight that is separated from the rotor core, so that it is possible to reduce a manufacturing cost and prevent deterioration of compression efficiency due to stirring of the refrigerant.

CITATION LIST

Patent Literature

Patent Literature 1: Japanese Laid-open Patent Publication No. H04-112652
Patent Literature 2: Japanese Laid-open Patent Publication No. 2003-219616
Patent Literature 3: Japanese Laid-open Patent Publication No. 2018-17201

SUMMARY

Technical Problem

However, when what is called an Interior Permanent Magnet (IPM) type rotator, in which a permanent magnet is embedded in a rotor core, is used, and if a size of an eccentric hole that is formed in the rotor core is increased in order to reduce eccentricity of a rotating body (a structural body that integrally rotates inside a compressor: for example, a shaft, an annular piston of a compression unit, and a rotor core of a rotator), a flow of a magnetic flux that passes through the rotor core may be disturbed, and efficiency of the motor may be reduced.

The disclosed technology has been conceived in view of the foregoing situations, and an object of the disclosed technology is to provide a compressor that reduces eccentricity of a rotating body and prevents reduction in efficiency of a motor.

Solution to Problem

According to an aspect of an embodiment, a compressor includes a shaft that is arranged along a rotation axis, a compression unit that drives along with rotation of the shaft, a rotor core that is fixed to the shaft, a plurality of permanent magnets that are embedded inside the rotor core, and a stator that causes the rotor core to rotate about the rotation axis, wherein a plurality of eccentric holes for adjusting balance when the shaft rotates are formed in the rotor core, and the plurality of eccentric holes are formed on an inner side of a polygonal region for which midpoints of sides at a side of the rotation axis among sides formed by side surfaces of the plurality of permanent magnets in a cross section perpendicular to the rotation axis serve as vertices.

Advantageous Effects of Invention

The disclosed compressor is able to reduce eccentricity of a rotating body that is arranged inside the compressor and prevent reduction in efficiency of a motor.

DESCRIPTION OF EMBODIMENTS

A compressor according to embodiments disclosed in the present application will be described below with reference to the drawings. The technology of the present disclosure is not limited by the description below. In addition, in the following description, the same components are denoted by the same reference symbols, and repeated explanation will be omitted.

First Embodiment

Figure 1:
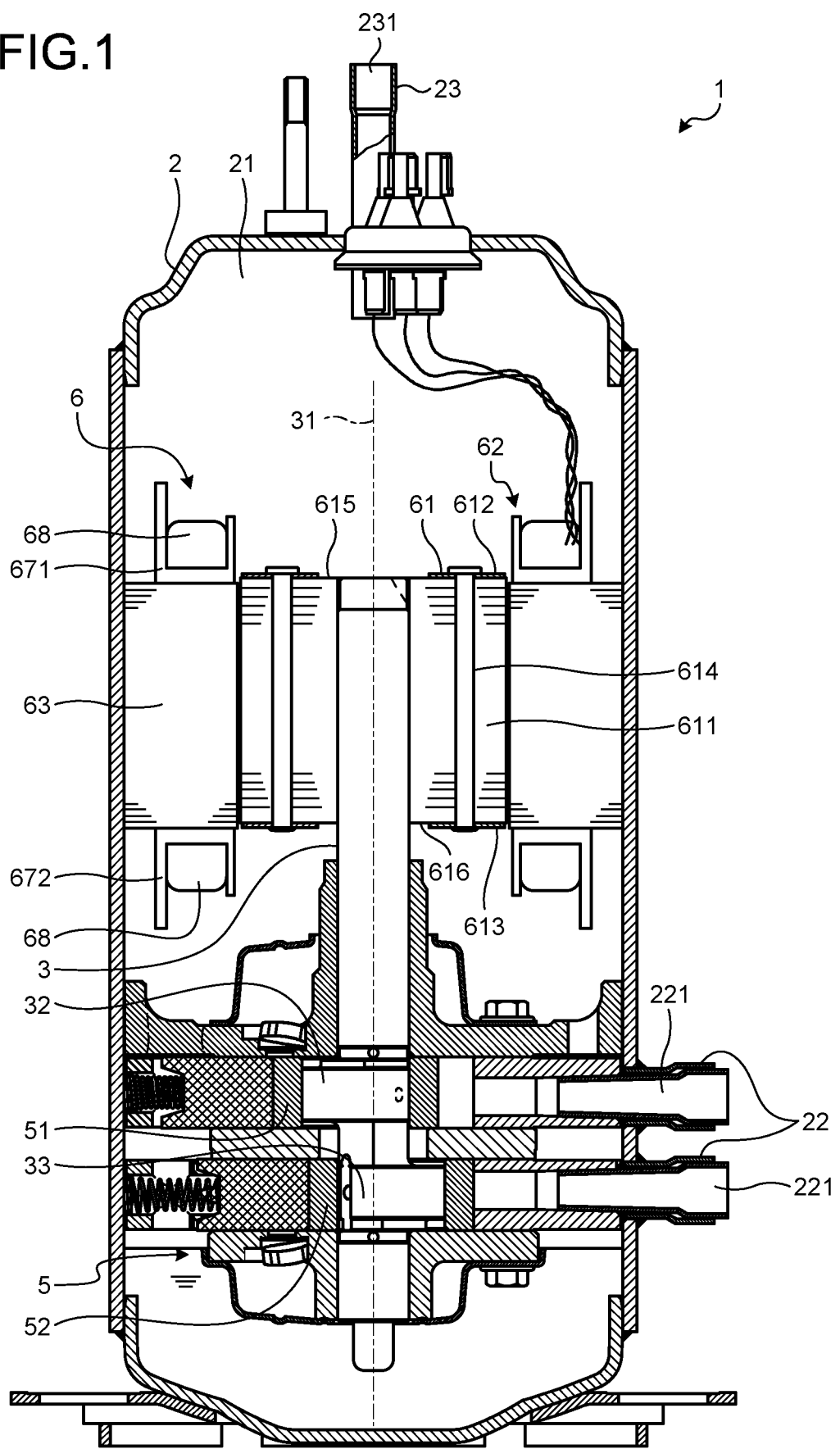
FIG. 1 is a vertical cross-sectional view of a compressor of a first embodiment.

A compressor 1 of a first embodiment includes, as illustrated in FIG. 1, a container 2, a shaft 3, a compression unit 5, and a motor unit 6. FIG. 1 is a vertical cross-sectional view of the compressor 1 of the first embodiment. A sealed internal space 21 is formed in the container 2. The internal space 21 is formed in an approximately cylindrical shape. The container 2 is formed such that a central axis of a cylinder formed by the internal space 21 is parallel to a vertical direction when the container 2 is vertically installed on a horizontal plane. The container 2 includes suction pipes 22 and a discharge pipe 23. Channels 221 are formed inside the suction pipes 22 and the suction pipes 22 are bonded to the container 2 such that the channels 221 are connected to a lower part of the internal space 21. A channel 231 is formed inside the discharge pipe 23 and the discharge pipe 23 is bonded to the container 2 such that the channel 231 is connected to an upper part of the internal space 21.

The shaft 3 is formed in a rod shape, and includes a first eccentric portion 32 and a second eccentric portion 33. The shaft 3 is arranged in the internal space 21 such that the shaft 3 extends along a rotation axis 31 that overlaps with the central axis of the cylinder formed by the internal space 21 and such that the first eccentric portion 32 and the second eccentric portion 33 are arranged in a lower portion of the internal space 21, and is supported by the container 2 so as to be rotatable about the rotation axis 31.

The compression unit 5 is arranged in a lower portion of the internal space 21 so as to surround the first eccentric portion 32 and the second eccentric portion 33 of the shaft 3. The compression unit 5 is what is called a rotary type compression mechanism and includes a first annular piston 51 and a second annular piston 52. The first annular piston 51 is fitted to the first eccentric portion 32 and revolves with rotation of the shaft 3. The second annular piston 52 is fitted to the second eccentric portion 33 and revolves with rotation of the shaft 3. With the revolution of the first annular piston 51 and the second annular piston 52, the compression unit 5 compresses a refrigerant that is supplied from the suction pipes 22, and supplies the compressed refrigerant to a space above the compression unit 5 in the internal space 21. In other words, the compression unit 5 drives along with the rotation of the shaft 3.

The motor unit 6 is arranged in a space above the compression unit 5 in the internal space 21. The motor unit 6 includes a rotor 61 and a stator 62. The rotor 61 includes a rotor core 611, an upper end plate 612, a lower end plate 613, and a plurality of rivets 614. The rotor core 611 is formed in an approximately cylindrical shape. The rotor core 611 is arranged such that a central axis of the cylinder overlaps with the rotation axis 31 and is fixed to the shaft 3. In other words, the rotor core 611 is supported by the container 2 so as to be rotatable about the rotation axis 31 via the shaft 3. The upper end plate 612 is formed in an approximately disc shape, and arranged so as to cover an upper end surface 615 of the rotor core 611. The lower end plate 613 is formed in an approximately disc shape, and arranged so as to cover a lower end surface 616 of the rotor core 611. The plurality of rivets 614 are made of magnetic materials and formed in rod shapes. The plurality of rivets 614 penetrate through the rotor core 611 in a top-bottom direction that is parallel to the rotation axis 31 and are caulked to fix the upper end plate 612 and the lower end plate 613 to the rotor core 611.

The stator 62 is formed in an approximately cylindrical shape. The stator 62 is arranged so as to surround the cylindrical rotor 61 and fixed to the container 2. The rotor 61 and the stator 62 are coaxially arranged such that respective central axes coincide with each other. The stator 62 includes a stator core 63, an upper insulator 671, a lower insulator 672, and a plurality of windings 68.

Figure 2:
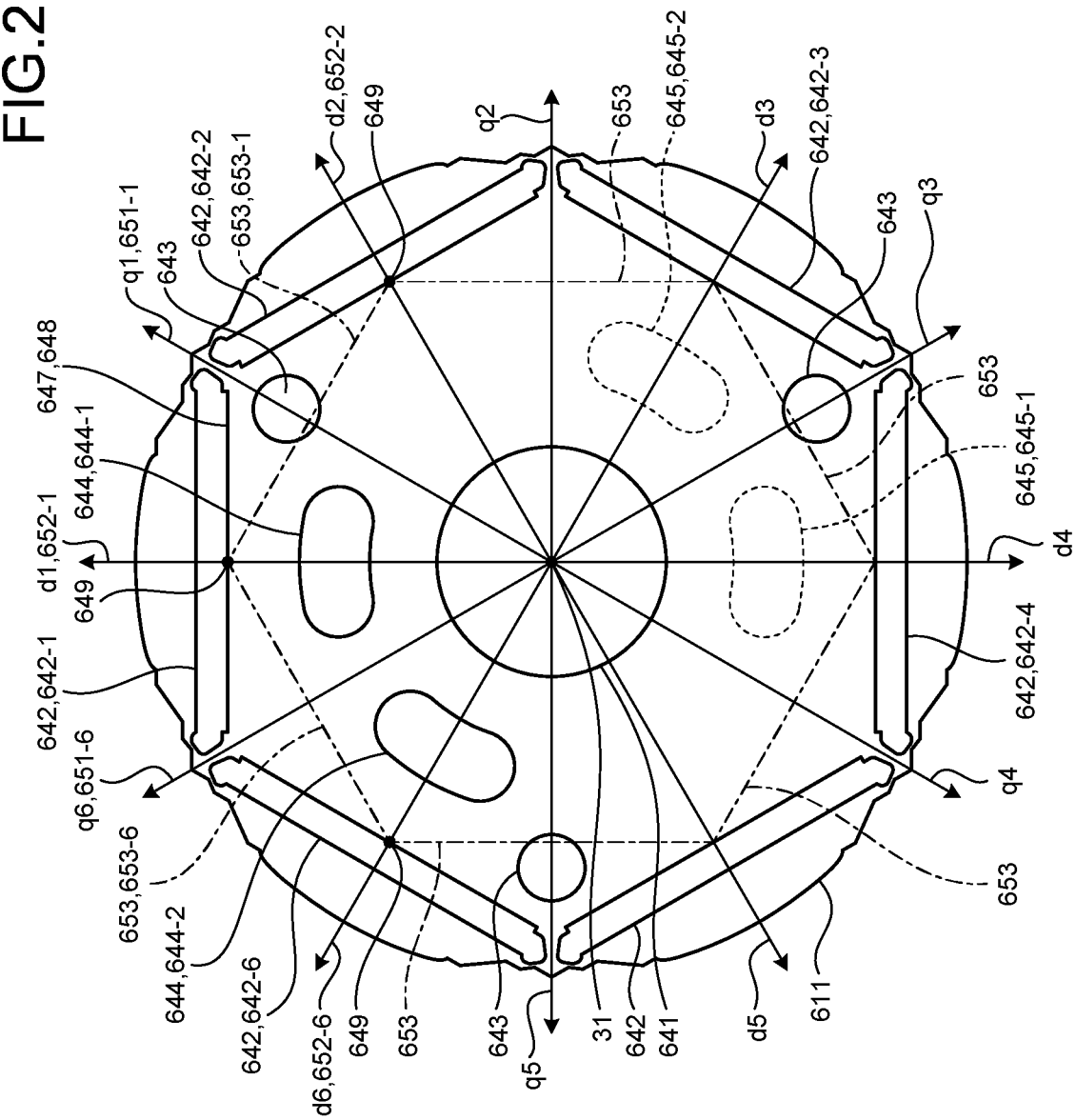
FIG. 2 is a top view of a rotor core of the compressor of the first embodiment.

FIG. 2 is a top view of the rotor core 611 of the compressor 1 of the first embodiment. In the rotor core 611, directions of magnetic fluxes that pass through centers in cross sections of a plurality of permanent magnets 655 (655-1 to 655-6) perpendicular to the rotation axis 31 are denoted by d axes d1 to d6. Further, directions magnetically perpendicular to the plurality of d axes d1 to d6 are denoted by a plurality of q axes q1 to q6. The plurality of d axes d1 to d6 are perpendicular to the rotation axis 31 and radially extend from the rotation axis 31 at regular intervals in a circumferential direction of the rotor core 611 so as to pass through the centers in the cross sections of the permanent magnets 655-1 to 655-6 perpendicular to the rotation axis 31. The plurality of q axes q1 to q6 pass through positions between the adjacent two permanent magnets (between the adjacent two d axes among the plurality of d axes d1 to d6). Specifically, the plurality of d axes d1 to d6 and the plurality of q axes q1 to q6 are perpendicular to the rotation axis 31, are alternately arranged at regular intervals in the circumferential direction of the rotor core 611, and radially extend from the rotation axis 31.

The rotor core 611 includes a shaft hole 641, a plurality of magnet holes 642, a plurality of rivet holes 643, a plurality of upper-end-side eccentric holes 644, and a plurality of lower-end-side eccentric holes 645. The shaft hole 641 is formed along the rotation axis 31 so as to overlap with the rotation axis 31 and so as to penetrate through the upper end surface 615 and the lower end surface 616 of the rotor core 611. The shaft 3 penetrates through the shaft hole 641 and is shrunk fit, so that the rotor core 611 is fixed to the shaft 3.

The plurality of magnet holes 642 are formed at positions corresponding to the plurality of d axes d1 to d6 in the circumferential direction of a circle formed by the rotor core 611 (such that the d axes d1 to d6 pass through centers of the corresponding magnet holes 642 in a cross section perpendicular to the rotation axis 31). Each of the magnet holes 642 is formed so as to penetrate through the upper end surface 615 and the lower end surface 616 of the rotor core 611. For example, as for a first magnet hole 642-1 that is one of the magnet holes 642, an inner-peripheral-side inner wall surface 647 that is located on an inner peripheral side close to the rotation axis 31 among inner wall surfaces of the first magnet hole 642-1 is formed in the first magnet hole 642-1. The inner-peripheral-side inner wall surface 647 is formed in an approximately flat shape. The first magnet hole 642-1 is formed such that a side 648 along the inner-peripheral-side inner wall surface 647 is perpendicular to the first d axis d1 in the cross section perpendicular to the rotation axis 31. The first magnet hole 642-1 is formed such that the first d axis d1 passes through a midpoint 649 (a center point 657) that is a midpoint of the side 648 (the inner-peripheral-side inner wall surface 647). In other words, the midpoint 649 (the center point 657) overlaps with a foot of a perpendicular line that is extended from the rotation axis 31 to the side 648 in the cross section perpendicular to the rotation axis 31.

The first magnet hole 642-1 is arranged between a second magnet hole 642-2 and a sixth magnet hole 642-6 among the plurality of magnet holes 642 in the circumferential direction of the rotor core 611, that is, the first magnet hole 642-1 is adjacent to the second magnet hole 642-2 and adjacent to the sixth magnet hole 642-6. Here, the q axes q1 to q6 are half lines for which the rotation axis 31 of the rotor 61 serve as start points and which pass through positions between the two adjacent permanent magnets 655 in the circumferential direction of the rotor core 611. The q axes q1 to q6 are aligned at regular intervals in the circumferential direction of the rotor core 611. For example, the first magnet hole 642-1 is formed between the first q axis q1 and the sixth q axis q6 that are adjacent to each other in the circumferential direction of the rotor core 611 among the plurality of q axes q1 to q6. The magnet holes other than the first magnet hole 642-1 among the plurality of magnet holes 642 are formed in the same manner as the first magnet hole 642-1.

Each of the rivet holes 643 is formed parallel to the rotation axis 31 and so as to penetrate through the upper end surface 615 and the lower end surface 616 of the rotor core 611. Each of the rivet holes 643 is formed in the vicinity of a position between the two adjacent magnet holes among the plurality of magnet holes 642, and formed on an inner peripheral side closer to the rotation axis 31 than the plurality of magnet holes 642. In other words, each of the rivet holes 643 is formed so as to intersect with the corresponding q axis among the plurality of q axes q1 to q6. Furthermore, a distance from each of the rivet holes 643 to the rotation axis 31 is shorter than a distance from each of the magnet holes 642 to the rotation axis 31.

A first upper-end-side eccentric hole 644-1 that is one of the upper-end-side eccentric holes 644 is formed so as to have a larger cross-sectional area than a cross-sectional area of a single (each) rivet hole among the plurality of rivet holes 643 and so as to be located on an inner peripheral side of the first magnet hole 642-1. Further, the first upper-end-side eccentric hole 644-1 is formed so as to be located on an inner side of a polygonal region 653 for which the midpoints 649 of the above-described sides 648 of all of the magnet holes 642 serve as vertices. Each of sides (653-1 to 653-6) that form the polygonal region 653 is a line segment that connects the center points 657 (the midpoints 649) of the two adjacent magnet holes among the plurality of magnet holes 642. For example, the first side 653-1 among the sides 653-1 to 653-6 that form the polygonal region 653 is a line segment that connects the center point 657 (the midpoint 649) of the first magnet hole 642-1 and the center point 657 (the midpoint 649) of the second magnet hole 642-2. The sixth side 653-6 among the sides 653-1 to 653-6 is a line segment that connects the center point 657 (the midpoint 649) of the first magnet hole 642-1 and the center point 657 (the midpoint 649) of the sixth magnet hole 642-6. With the six line segments (the sides 653-1 to 653-6) that are connected as described above, the polygonal (a regular hexagon in the embodiment) region 653 is formed on an inner diameter side relative to a region that is enclosed by the plurality of permanent magnets 655 of the rotor core 611 in the cross section perpendicular to the rotation axis 31.

In this case, the first upper-end-side eccentric hole 644-1 is arranged on an inner peripheral side closer to the rotation axis 31 than the first side 653-1 and is arranged on an inner peripheral side closer to the rotation axis 31 than the sixth side 653-6. Further, the first upper-end-side eccentric hole 644-1 is formed so as not to be located on an outer peripheral side farther away from the rotation axis 31 than the first side 653-1, and so as not to be located on an outer peripheral side farther away from the rotation axis 31 than the sixth side 653-6. In other words, the first upper-end-side eccentric hole 644-1 is arranged on the inner side of the polygonal (a regular hexagon in the embodiment) region 653 for which the midpoints 649 (the center points 657) of the sides 648 of the plurality of permanent magnets 655 serve as vertices. Furthermore, the first upper-end-side eccentric hole 644-1 is formed so as to intersect with the first d axis d1 and so as to be plane symmetric with respect to a first d-axis plane 652-1 that is a plane passing through the first d axis d1 and the rotation axis 31. In other words, the first upper-end-side eccentric hole 644-1 is formed so as to be line symmetric with respect to the first d axis d1 in the cross section perpendicular to the central axis. A second upper-end-side eccentric hole 644-2 among the plurality of upper-end-side eccentric holes 644 is formed on the inner peripheral side of the region 653 so as not to be located on the outer peripheral side relative to the polygonal region 653, similarly to the first upper-end-side eccentric hole 644-1.

A first lower-end-side eccentric hole 645-1 among the plurality of lower-end-side eccentric holes 645 is formed on an inner peripheral side of a fourth magnet hole 642-4 so as not to be located on the outer peripheral side relative to the polygonal region 653, similarly to each of the upper-end-side eccentric holes 644. Further, the first lower-end-side eccentric hole 645-1 is formed such that the first lower-end-side eccentric hole 645-1 and the first upper-end-side eccentric hole 644-1 are point symmetric with respect to a center point of the rotor core 611 in the top-bottom direction on the rotation axis 31. A second lower-end-side eccentric hole 645-2 among the plurality of lower-end-side eccentric holes 645 is formed on an inner peripheral side of a third magnet hole 642-3 so as not to be located on the outer peripheral side relative to the polygonal region 653, similarly to the first lower-end-side eccentric hole 645-1. Furthermore, the second lower-end-side eccentric hole 645-2 is formed such that the second lower-end-side eccentric hole 645-2 and the second upper-end-side eccentric hole 644-2 are point symmetric with respect to the center point of the rotor core 611 on the rotation axis 31.

Figure 3:
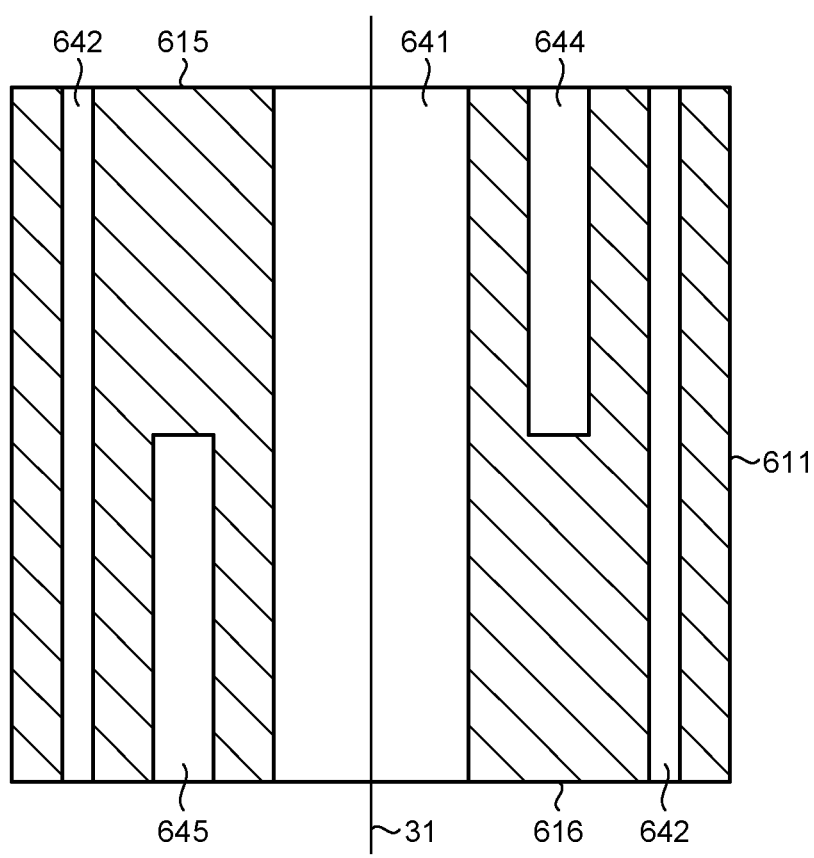
FIG. 3 is a cross-sectional view of the rotor core of the compressor of the first embodiment.

FIG. 3 is a cross-sectional view of the rotor core 611 of the compressor 1 of the first embodiment. Each of the upper-end-side eccentric holes 644 is formed parallel to the rotation axis 31 and formed in a hole that is recessed from the upper end surface 615 so as not to penetrate through the lower end surface 616. Each of the lower-end-side eccentric holes 645 is formed parallel to the rotation axis 31 and formed in a hole that is recessed from the lower end surface 616 so as not to penetrate through the upper end surface 615.

Figure 4:
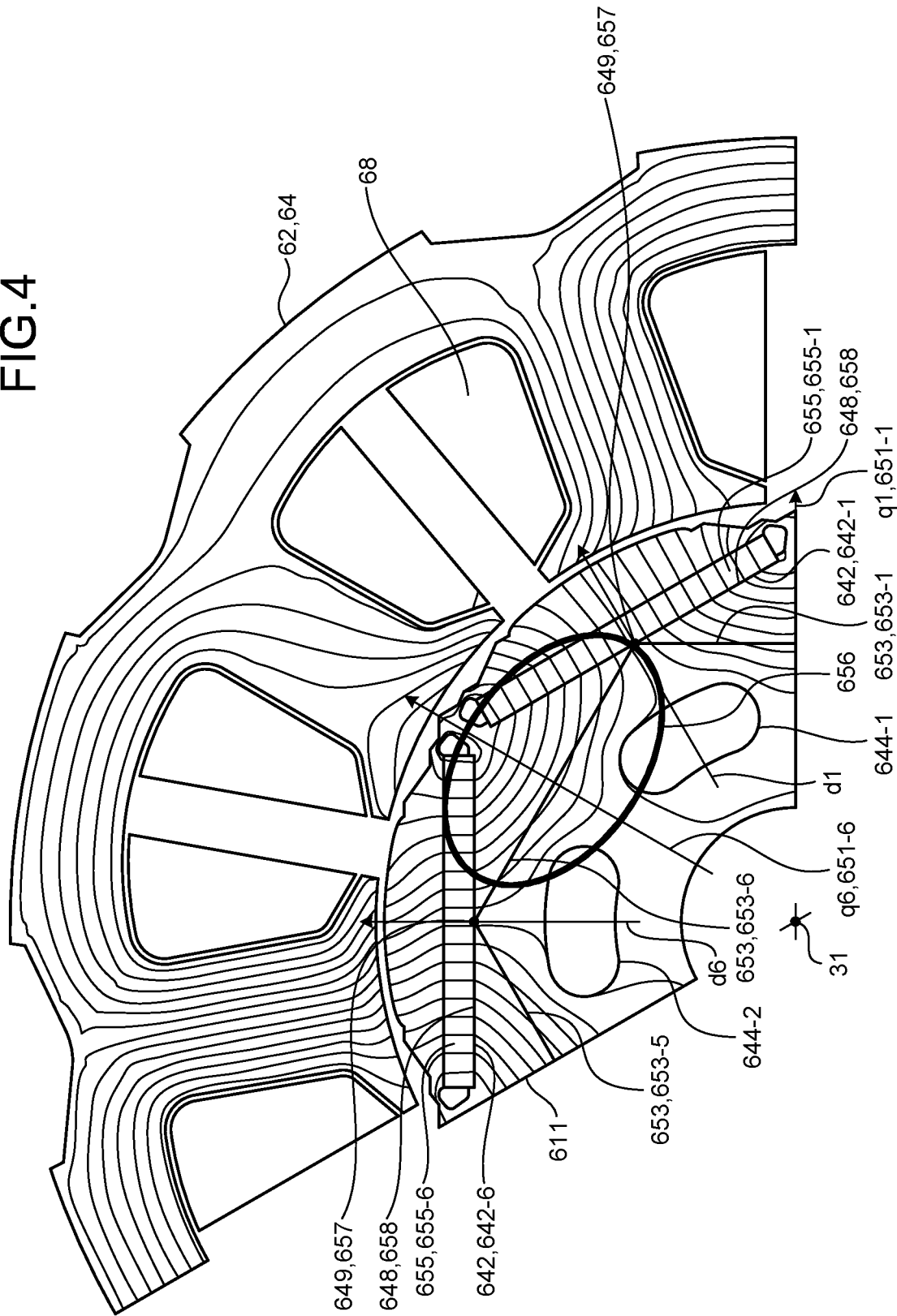
FIG. 4 is a diagram illustrating a flow of a magnetic flux that passes through the rotor core.

FIG. 4 is a diagram illustrating a flow of a magnetic flux that passes through the rotor core 611. The rotor 61 further includes the plurality of permanent magnets 655. Each of the permanent magnets 655 is formed in a plate shape (rectangular solid shape) such that an N-pole appears on one surface of the plate and an S-pole appears on the other surface of the plate. In the plurality of permanent magnets 655, magnetic fluxes generated by the respective permanent magnets 655 flow along the plurality of d axes d1 to d6.

An inner-peripheral-side surface 658 is formed at a side close to the rotation axis 31 in the first permanent magnet 655-1 that is arranged inside the first magnet hole 642-1 among the plurality of permanent magnets 655. The first magnet hole 642-1 is arranged such that the inner-peripheral-side surface 658 extends along the side 648 and the center point 657 of the inner-peripheral-side surface 658 overlaps with the midpoint 649 of the side 653-1. In this case, in the first permanent magnet 655-1, a direction of a magnetic flux that is generated by the first permanent magnet 655-1 goes along the first d axis d1. The permanent magnets other than the first permanent magnet 655-1 among the plurality of permanent magnets 655 are arranged in the same manner as the first permanent magnet 655-1.

Further, the plurality of permanent magnets 655 are arranged such that orientations of magnetic poles of the two permanent magnets that are arranged inside the two adjacent magnet holes are different from each other. Specifically, the plurality of permanent magnets 655 are arranged such that the magnetic pole on an inner peripheral side of the sixth permanent magnet 655-6 that is adjacent to the first permanent magnet 655-1 is different from the magnetic pole on an inner peripheral side of the first permanent magnet 655-1. The upper end plate 612 covering the upper end surface 615 and the lower end plate 613 covering the lower end surface 616 are fixed to the rotor core 611, so that the plurality of permanent magnets 655 are fixed to the rotor core 611 such that the plurality of permanent magnets 655 do not come off from the plurality of magnet holes 642.

As for the flow of the magnetic flux that passes through a region corresponding to the sixth q axis q6 in the rotor core 611, in other words, the flow of the magnetic flux that passes through the region 656 in the vicinity of the sixth q axis q6 as illustrated in FIG. 4, a magnetic flux line that passes through the first permanent magnet 655-1 extends so as to intersect with the side 648 corresponding to the first permanent magnet 655-1, and a magnetic flux line that passes through the sixth permanent magnet 655-6 adjacent to the first permanent magnet 655-1 extends so as to intersect with the side 648 corresponding to the sixth permanent magnet 655-6. Furthermore, a magnetic flux line passes through the inside of the rotor core 611 in a circular arc shape so as to moderately connect the magnetic flux line that passes through the first permanent magnet 655-1 and the magnetic flux line that passes through the sixth permanent magnet 655-6. In this case, the magnetic flux line passes a path that avoids the upper-end-side eccentric holes 644 that are openings, but all of the upper-end-side eccentric holes 644 are formed on the inner side (inner peripheral side) of the polygonal region 653, so that the path of the circular arc magnetic flux line that passes through the inside of the rotor core 611 as described above is not largely distorted. With this configuration, a magnetic flux path in the vicinity of the upper-end-side eccentric holes 644 in the rotor core 611 can be made similar to a flow of a magnetic flux that passes through a region in the vicinity of the q axis that is not located close to the upper-end-side eccentric holes 644 among the plurality of q axes q1 to q6, so that it is possible to prevent reduction in efficiency of a motor due to distortion of the flow of the magnetic flux. Furthermore, similarly to the plurality of upper-end-side eccentric holes 644, all of the lower-end-side eccentric holes 645 are formed on the inner side (inner peripheral side) of the polygonal region 653, so that a path of the circular arc magnetic flux line that passes through the inside of the rotor core 611 is not largely distorted. Therefore, the lower-end-side eccentric holes 645 are able to prevent reduction in the efficiency of the motor due to distortion of the flow of the magnetic flux. Consequently, the rotor core 611 is rotated by a rotary magnetic field that is generated by the stator 62, and is able to realize the same magnetic flux path as in a case in which the upper-end-side eccentric holes or the lower-end-side eccentric holes are not formed, so that it is possible to prevent reduction in the efficiency of the motor unit 6. Furthermore, the upper-end-side eccentric holes 644 that are formed so as to be located close to one end side of the rotor core 611 and the lower-end-side eccentric holes 645 that are formed so as to be located close to the other end side of the rotor core 611 are arranged in a point symmetric manner (separated by 180 degrees) in the circumferential direction in the cross section perpendicular to the rotation axis 31, so that the rotor 61 is made eccentric with respect to the rotation axis 31, and the eccentric holes function as a balancer of the rotating body. As a result, the compressor 1 is able to reduce eccentricity of the rotating body and prevent reduction in the efficiency of the motor unit 6, so that it is possible to highly efficiently compress the refrigerant. Furthermore, the compressor 1 need not include a balance weight for reducing vibration separately from the rotor core 611, so that it is possible to reduce a manufacturing cost.

Operation of Compressor 1

The compressor 1 is arranged in a refrigeration cycle device (not illustrated) and is used to compress a refrigerant and circulate the refrigerant in the refrigeration cycle device. The motor unit 6 generates a rotating magnetic field in an internal space of the stator 62 by appropriately applying three phase voltage to the plurality of windings 68. The rotor 61 rotates with the aid of the rotating magnetic field that is generated by the stator 62. The shaft 3 transmits the rotation of the rotor 61 to the compression unit 5.

The shaft 3 relatively largely vibrates when rotating about the rotation axis 31 without the rotor 61 because of arrangement of the first eccentric portion 32 and the second eccentric portion 33 that are fitted to the first annular piston 51 and the second annular piston 52. In the compressor 1, the plurality of upper-end-side eccentric holes 644 are formed so as to be located close to one end side of the rotor core 611 that is fixed to the shaft 3 and the plurality of lower-end-side eccentric holes 645 are formed so as to be located close to the other end side of the rotor core 611. Further, the plurality of upper-end-side eccentric holes 644 and the plurality of lower-end-side eccentric holes 645 are arranged so as to be point symmetric with each other (separated from each other by 180 degrees) in the circumferential direction in the cross section perpendicular to the rotation axis 31, so that a center of gravity of an upper half of the rotor core 611 is located close to the lower-end-side eccentric holes 645, and a center of gravity of a lower half of the rotor core 611 is located close to the upper-end-side eccentric holes 644. Furthermore, due to inclination of the center of gravity of the rotor core 611 as described above, it is possible to keep balance of the rotating body formed of the shaft 3, the first annular piston 51, the second annular piston 52, and the rotor 61. The compressor 1 is able to reduce the vibration by keeping balance of the rotating body.

The first annular piston 51 and the second annular piston 52 revolve with the rotation of the rotor 61. Due to the revolution of the first annular piston 51 and the second annular piston 52, the compression unit 5 sucks a low pressure gas refrigerant via the suction pipes 22, and compresses the sucked low pressure gas refrigerant to generate a high pressure gas refrigerant. The generated high pressure gas refrigerant is supplied to a space between the compression unit 5 and the motor unit 6 in the internal space 21. The high pressure gas refrigerant that is supplied to the space between the compression unit 5 and the motor unit 6 in the internal space 21 passes through a gap that is formed in the motor unit 6, and is then supplied to a space above the motor unit 6 in the internal space 21. The high pressure gas refrigerant that is supplied to the space above the motor unit 6 in the internal space 21 is discharged to a device in the subsequent stage of the compressor 1 in the refrigeration cycle device via the discharge pipe 23.

In a compressor of a comparative example, in which a balance weight for keeping balance of a rotating body (a rotator or a shaft) is arranged in the rotor 61, the balance weight stirs a refrigerant in the internal space 21, so that flow resistance occurs when the refrigerant passes inside the compressor and compression efficiency may be reduced. The compressor 1 of the first embodiment, because the balance weight is not arranged in the rotor 61, is able to reduce stirring of the refrigerant in the internal space 21, and is able to prevent reduction in compression efficiency for the refrigerant as compared to the compressor of the comparative example.

Effect of Compressor 1 of First Embodiment

The compressor 1 of the first embodiment includes the compression unit 5, the rotor core 611, the plurality of permanent magnets 655, and the stator 62. The compression unit 5 compresses a refrigerant along with rotation of the shaft 3 about the rotation axis 31. The rotor core 611 is fixed to the shaft 3. The plurality of permanent magnets 655 are embedded inside the rotor core 611. The stator 62 causes the rotor core 611 to rotate about the rotation axis 31. The plurality of upper-end-side eccentric holes 644 and the plurality of lower-end-side eccentric holes 645 for adjusting balance at the time of rotation of the shaft 3 are formed in the rotor core 611. The plurality of upper-end-side eccentric holes 644 and the plurality of lower-end-side eccentric holes 645 are formed on an inner side of a second region (the polygonal region 653) that is smaller than a first region that is enclosed by the plurality of permanent magnets 655 in the rotor core 611. The center points 657 (the midpoints 649) that serve as vertices of a polygon that forms the second region (the polygonal region 653) are the center points 657 (the midpoints 649) of the inner-peripheral-side surfaces 658 (the sides 648) of the permanent magnets 655-1 to 655-6. Furthermore, each of the sides of the polygon that forms the region 653 is a line segment that connects the center point 657 (the midpoint 649) of the inner-peripheral-side surface 658 (the side 648) of one (for example, the permanent magnet 655-1) of the two adjacent permanent magnets and the center point 657 (the midpoint 649) of the inner-peripheral-side surface 658 (the side 648) of the other one (for example, the permanent magnet 655-6) of the two adjacent permanent magnets.

The compressor 1 need not include a balance weight for reducing eccentricity of the rotating body separately from the rotor core 611, so that it is possible to reduce a manufacturing cost, and prevent deterioration of compression efficiency due to stirring of the refrigerant. Further, the compressor 1 is able to prevent the plurality of upper-end-side eccentric holes 644 and the plurality of lower-end-side eccentric holes 645 from disturbing the flow of the magnetic flux that passes through the rotor core 611. The compressor 1 prevents disturbance of the flow of the magnetic flux, so that it is possible to highly efficiently rotate the shaft 3 and highly efficiently compress the refrigerant.

Furthermore, the compressor 1 of the first embodiment further includes the upper end plate 612 and the lower end plate 613 that cover the upper end surface 615 and the lower end surface 616 of the rotor core 611 to fix the plurality of permanent magnets 655 to the rotor core 611, and the plurality of rivets 614 that fix the upper end plate 612 and the lower end plate 613 to the rotor core 611. The plurality of rivet holes 643, through which the plurality of rivets 614 penetrate, are formed in the rotor core 611. In a plane perpendicular to the rotation axis 31, a cross-sectional area of one eccentric hole among the plurality of upper-end-side eccentric holes 644 and the plurality of lower-end-side eccentric holes 645 is larger than a cross-sectional area of each of the rivet holes 643. In the compressor 1, the rivet holes 643 with small cross-sectional areas are arranged above the q axes, so that it is possible to prevent the plurality of rivet holes 643 from disturbing the flow of the magnetic flux that passes through the rotor core 611.

Meanwhile, the cross-sectional area of each of the rivet holes 643 in the compressor 1 of the first embodiment as described above may be larger than a cross-sectional area of one eccentric hole among the plurality of upper-end-side eccentric holes 644 and the plurality of lower-end-side eccentric holes 645. A magnetic flux that passes through the rotor core 611 can more easily pass through the plurality of rivet holes 643 as compared to the eccentric holes because the plurality of rivets 614 are inserted in the plurality of rivet holes 643. Therefore, the compressor 1 is able to reduce disturbance of the flow of the magnetic flux even if the cross-sectional areas of the plurality of rivet holes 643 are larger than the cross-sectional areas of the eccentric holes.

Second Embodiment

Figure 5:
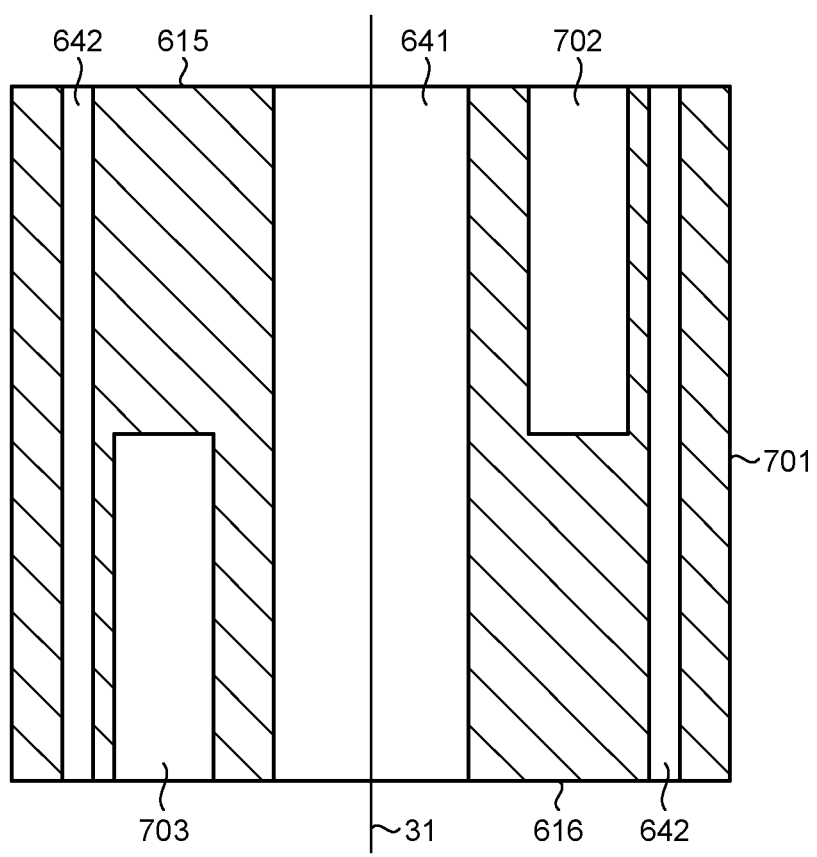
FIG. 5 is a cross-sectional view of a rotor core of a compressor of a second embodiment.

A compressor of a second embodiment is configured such that, as illustrated in FIG. 5, the rotor core 611 of the compressor 1 of the first embodiment as described above is replaced with a different rotor core 701, and other components are the same as those of the compressor 1 as described above. FIG. 5 is a cross-sectional view of the rotor core 701 of the compressor of the second embodiment. The rotor core 701 is configured by replacing the plurality of upper-end-side eccentric holes 644 and the plurality of lower-end-side eccentric holes 645 of the rotor core 611 as described above with a plurality of different upper-end-side eccentric holes 702 and a plurality of different lower-end-side eccentric holes 703, and other components are the same as those of the rotor core 611 as described above. Each of the upper-end-side eccentric holes 702 is formed parallel to the rotation axis 31 and formed in a hole that is recessed from the upper end surface 615 so as not to penetrate through the lower end surface 616, similarly to the plurality of upper-end-side eccentric holes 644. The plurality of lower-end-side eccentric holes 703 are formed such that the plurality of lower-end-side eccentric holes 703 and the plurality of upper-end-side eccentric holes 702 are point symmetric with respect to a center point of the rotor core 701 in the top-bottom direction on the rotation axis 31. In other words, each of the lower-end-side eccentric holes 703 is formed parallel to the rotation axis 31 and formed in a hole that is recessed from the lower end surface 616 so as not to penetrate through the upper end surface 615, similarly to the plurality of lower-end-side eccentric holes 645.

Figure 6:
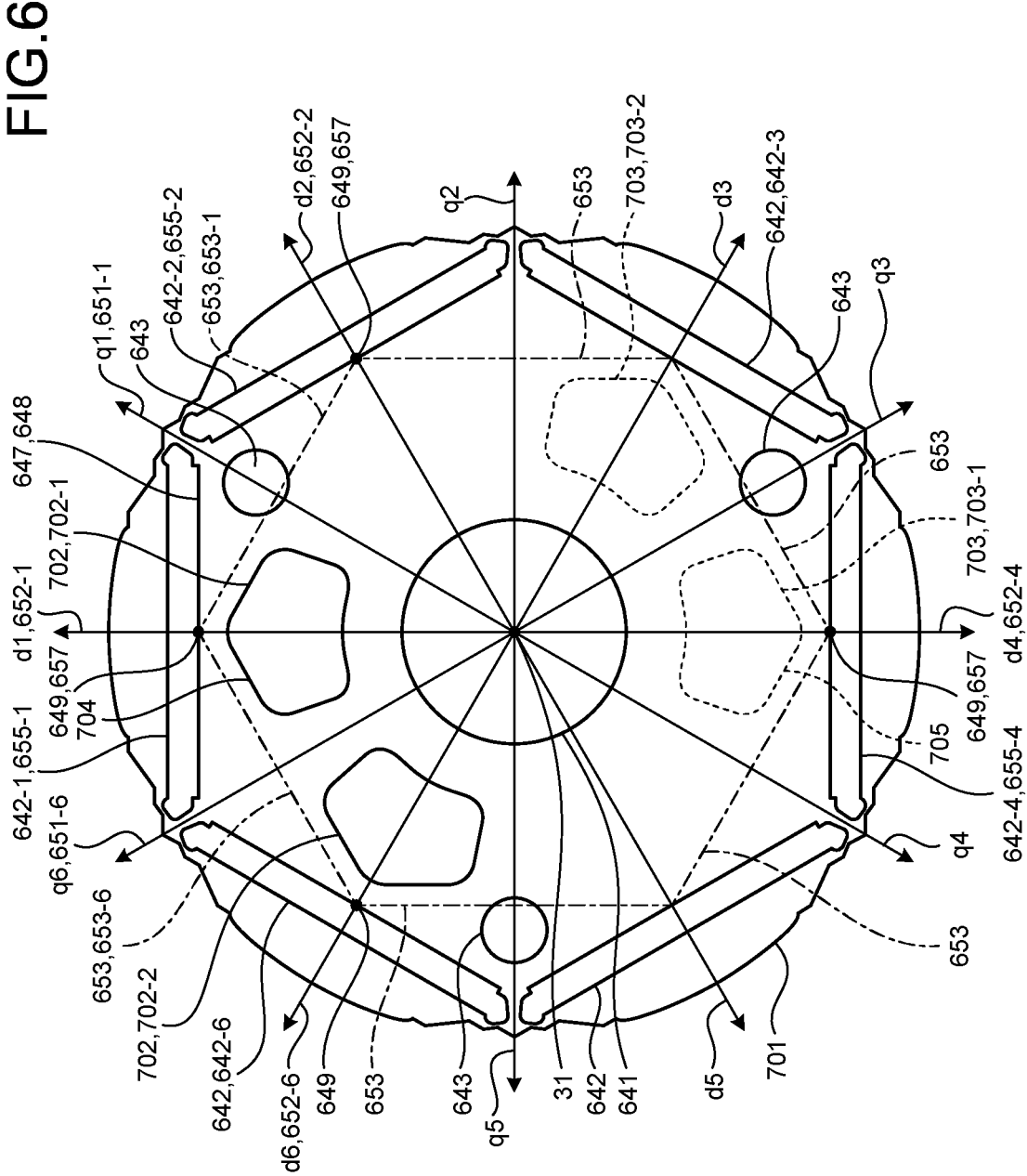
FIG. 6 is a top view of the rotor core of the compressor of the second embodiment.

FIG. 6 is a top view of the rotor core 701 of the compressor of the second embodiment. The plurality of upper-end-side eccentric holes 702 are formed on the inner side of the polygonal (a regular hexagon in the embodiment) region 653, similarly to the plurality of upper-end-side eccentric holes 644 as described above. A first upper-end-side eccentric hole 702-1 among the plurality of upper-end-side eccentric holes 702 is formed on the inner peripheral side of the first magnet hole 642-1. The first upper-end-side eccentric hole 702-1 is formed such that a cross section perpendicular to the rotation axis 31 has an approximately pentagonal shape. An outer-peripheral-side inner wall surface 704, which is located on an outer peripheral side among inner wall surfaces of the first upper-end-side eccentric hole 702-1, is formed in the first upper-end-side eccentric hole 702-1. The outer-peripheral-side inner wall surface 704 is bent such that a portion (portion overlapping with the first d axis d1) that intersects with the first d-axis plane 652-1 that is a plane passing through the first d axis d1 and the rotation axis 31 in the outer-peripheral-side inner wall surface 704 is located closest to the side 648. Furthermore, the outer-peripheral-side inner wall surface 704 is bent so as to be located farther away from the side 648 with an increase in a distance from the center point 657 of the first permanent magnet 655-1 along the polygonal region 653. A second upper-end-side eccentric hole 702-2 among the plurality of upper-end-side eccentric holes 702 is formed on the inner peripheral side of the sixth magnet hole 642-6, and is formed in the same manner as the first upper-end-side eccentric hole 702-1.

The plurality of lower-end-side eccentric holes 703 are formed such that the plurality of lower-end-side eccentric holes 703 and the plurality of upper-end-side eccentric holes 702 are point symmetric with respect to the center point of the rotor core 701 in the top-bottom direction on the rotation axis 31. In other words, a first lower-end-side eccentric hole 703-1 among the plurality of lower-end-side eccentric holes 703 is formed on the inner peripheral side of the fourth magnet hole 642-4. The first lower-end-side eccentric hole 703-1 is formed such that a cross section perpendicular to the rotation axis 31 has an approximately pentagonal shape. An outer-peripheral-side inner wall surface 705, which is located on an outer peripheral side among inner wall surfaces of the first lower-end-side eccentric hole 703-1, is formed in the first lower-end-side eccentric hole 703-1. The outer-peripheral-side inner wall surface 705 is bent such that a portion (portion overlapping with the fourth d axis d4) that intersects with a fourth d-axis plane 652-4 in the outer-peripheral-side inner wall surface 705 is located closest to the side 648 (located on the most outer diameter side). Furthermore, the outer-peripheral-side inner wall surface 705 is bent so as to be located farther away from the side 648 with an increase in a distance from the center point 657 of the forth permanent magnet 655-4 along the polygonal region 653. A second lower-end-side eccentric hole 703-2 among the plurality of lower-end-side eccentric holes 703 is formed on the inner peripheral side of the third magnet hole 642-3, and formed in the same manner as the first lower-end-side eccentric hole 703-1.

The outer-peripheral-side inner wall surface 704 is bent so as to extend along the polygonal regions 653, so that the plurality of upper-end-side eccentric holes 702 can be formed such that inner volumes of the plurality of upper-end-side eccentric holes 702 are increased as compared to the plurality of upper-end-side eccentric holes 644 as described above. The outer-peripheral-side inner wall surface 705 is bent so as to extend along the polygonal region 653, so that the plurality of lower-end-side eccentric holes 703 can be formed such that inner volumes of the plurality of lower-end-side eccentric holes 703 are increased as compared to the plurality of lower-end-side eccentric holes 645 as described above.

In the compressor of the second embodiment, because the plurality of upper-end-side eccentric holes 702 and the plurality of lower-end-side eccentric holes 703 are arranged on the inner peripheral side of the polygonal region 653, it is possible to reduce eccentricity of the rotating body and prevent reduction in the efficiency of the motor unit 6, similarly to the compressor 1 of the first embodiment as described above. Furthermore, in the compressor of the second embodiment, because the volumes of the plurality of upper-end-side eccentric holes 702 and the plurality of lower-end-side eccentric holes 703 are increased, it is possible to increase the function of reducing eccentricity of the rotating body as compared to the compressor 1 of the first embodiment as described above.

Third Embodiment

Figure 7:
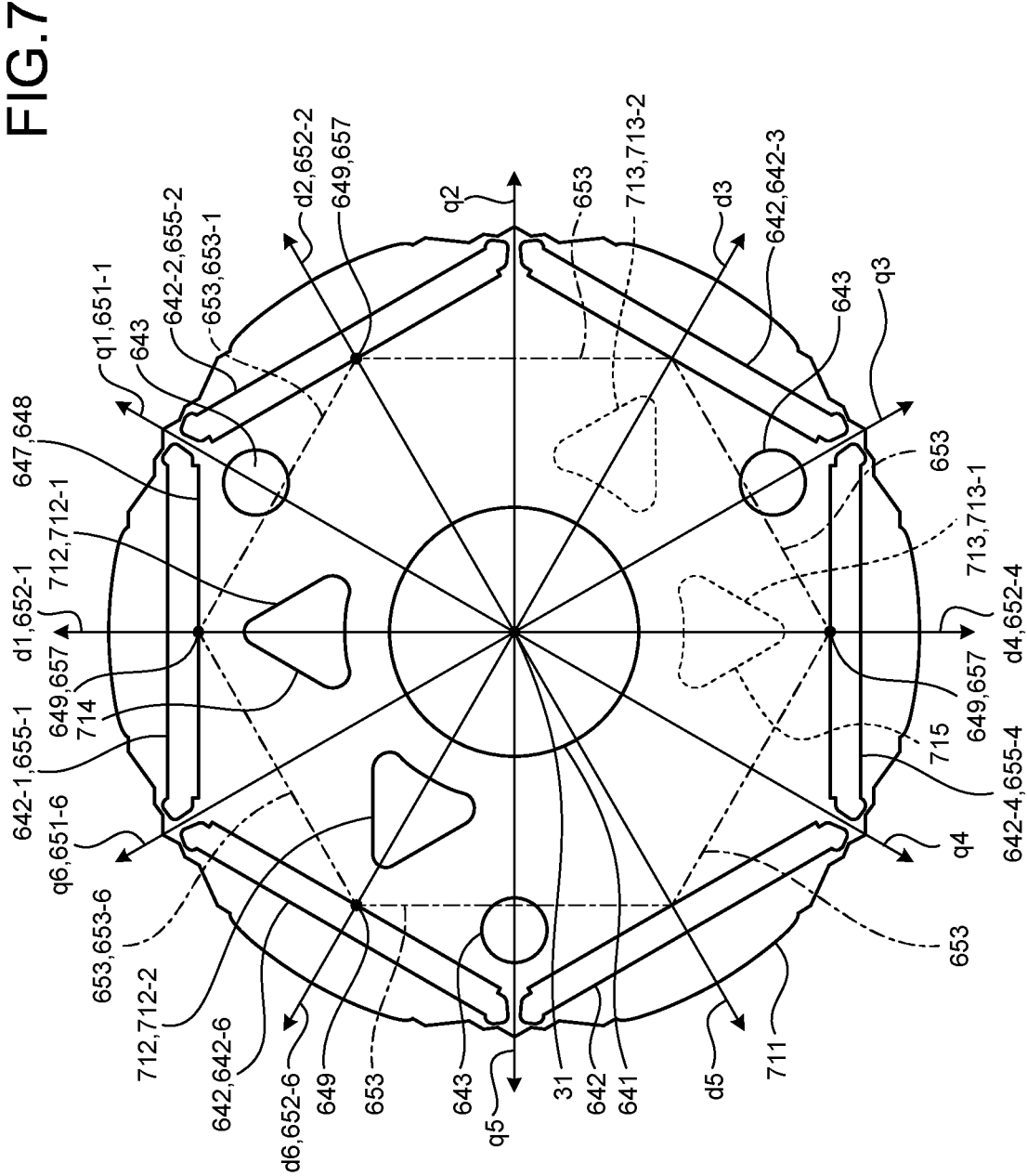
FIG. 7 is a top view of a rotor core of a compressor of a third embodiment.

While the outer-peripheral-side inner wall surfaces 704 and 705 of the compressor of the second embodiment are bent so as to extend along the polygonal region 653, the outer-peripheral-side inner wall surfaces 704 and 705 need not always extend along the polygonal region 653. A compressor of a third embodiment is configured such that, as illustrated in FIG. 7, the rotor core 701 of the compressor of the second embodiment as described above is replaced with a different rotor core 711, and other components are the same as those of the compressor of the second embodiment as described above. FIG. 7 is a top view of the rotor core 711 of the compressor of the third embodiment. The rotor core 711 is configured by replacing the plurality of upper-end-side eccentric holes 702 and the plurality of lower-end-side eccentric holes 703 of the rotor core 701 as described above with a plurality of different upper-end-side eccentric holes 712 and a plurality of lower-end-side eccentric holes 713, and other components are the same as those of the rotor core 701 as described above.

Each of the upper-end-side eccentric holes 712 is formed parallel to the rotation axis 31 and formed in a hole that is recessed from the upper end surface 615 so as not to penetrate to the lower end surface 616, similarly to the plurality of upper-end-side eccentric holes 702. A first upper-end-side eccentric hole 712-1 among the plurality of upper-end-side eccentric holes 712 is formed on the inner peripheral side of the first magnet hole 642-1. The first upper-end-side eccentric hole 712-1 is formed in an approximately triangular prism shape such that a cross section perpendicular to the rotation axis 31 has an approximately triangular shape. An outer-peripheral-side inner wall surface 714, which is located on an outer peripheral side among inner wall surfaces of the first upper-end-side eccentric hole 712-1, is formed in the first upper-end-side eccentric hole 712-1. The outer-peripheral-side inner wall surface 714 is bent such that a portion (portion overlapping with the first d axis d1) that intersects with the first d-axis plane 652-1 on the outer-peripheral-side inner wall surface 714 is located closest to the side 648. Furthermore, the outer-peripheral-side inner wall surface 714 is bent so as to be located farther away from the side 648 with an increase in a distance from the first d-axis plane 652-1. In this case, inclination of the outer-peripheral-side inner wall surface 714 with respect to the side 648 is larger than inclination of the first side 653-1 or the sixth side 653-6 with respect to the side 648. A second upper-end-side eccentric hole 712-2 among the plurality of upper-end-side eccentric holes 712 is formed on the inner peripheral side of the sixth magnet hole 642-6, and is formed in the same manner as the first upper-end-side eccentric hole 712-1.

The plurality of lower-end-side eccentric holes 713 are formed such that the plurality of lower-end-side eccentric holes 713 and the plurality of upper-end-side eccentric holes 712 are point symmetric with respect to the center point of the rotor core 711 in the top-bottom direction on the rotation axis 31. In other words, each of the lower-end-side eccentric holes 713 is formed parallel to the rotation axis 31 and formed in a hole that is recessed from the lower end surface 616 so as not to penetrate to the upper end surface 615. A first lower-end-side eccentric hole 713-1 among the plurality of lower-end-side eccentric holes 713 is formed on the inner peripheral side of the fourth magnet hole 642-4. The first lower-end-side eccentric hole 713-1 is formed such that a cross section perpendicular to the rotation axis 31 has an approximately triangular shape. An outer-peripheral-side inner wall surface 715, which is located on an outer peripheral side among inner wall surfaces of the first lower-end-side eccentric hole 713-1, is formed in the first lower-end-side eccentric hole 713-1. The outer-peripheral-side inner wall surface 715 is bent such that a portion (portion overlapping with the fourth d axis d4) that intersects with the fourth d-axis plane 652-4 on the outer-peripheral-side inner wall surface 715 is located closest to the side 648 (located on the most outer diameter side). Furthermore, the outer-peripheral-side inner wall surface 715 is bent so as to be located farther away from the side 648 with an increase in a distance from the fourth d-axis plane 652-4. In this case, inclination of the outer-peripheral-side inner wall surface 715 with respect to the side 648 is larger than inclination of the first side 653-1 or the sixth side 653-6 with respect to the side 648. A second lower-end-side eccentric hole 713-2 among the plurality of lower-end-side eccentric holes 713 is formed on the inner peripheral side of the third magnet hole 642-3, and is formed in the same manner as the first lower-end-side eccentric hole 713-1.

In the compressor of the third embodiment, because the plurality of upper-end-side eccentric holes 712 and the plurality of lower-end-side eccentric holes 713 are surrounded by the polygonal region 653, it is possible to reduce eccentricity of the rotating body and prevent reduction in the efficiency of the motor unit 6, similarly to the compressor 1 of the first embodiment as described above. In the compressor of the third embodiment, because the outer-peripheral-side inner wall surface 714 and the outer-peripheral-side inner wall surface 715 are largely inclined, it is possible to prevent distortion of the path of the magnetic flux line by the plurality of upper-end-side eccentric holes 712 and the plurality of lower-end-side eccentric holes 713 as compared to the compressor of the second embodiment as described above. In the compressor of the third embodiment, because the path of the magnetic flux line is less distorted by the plurality of upper-end-side eccentric holes 712 and the plurality of lower-end-side eccentric holes 713, it is possible further prevent reduction in the efficiency of the motor unit 6, as compared to the compressor of the second embodiment as described above.

Fourth Embodiment

Figure 8:
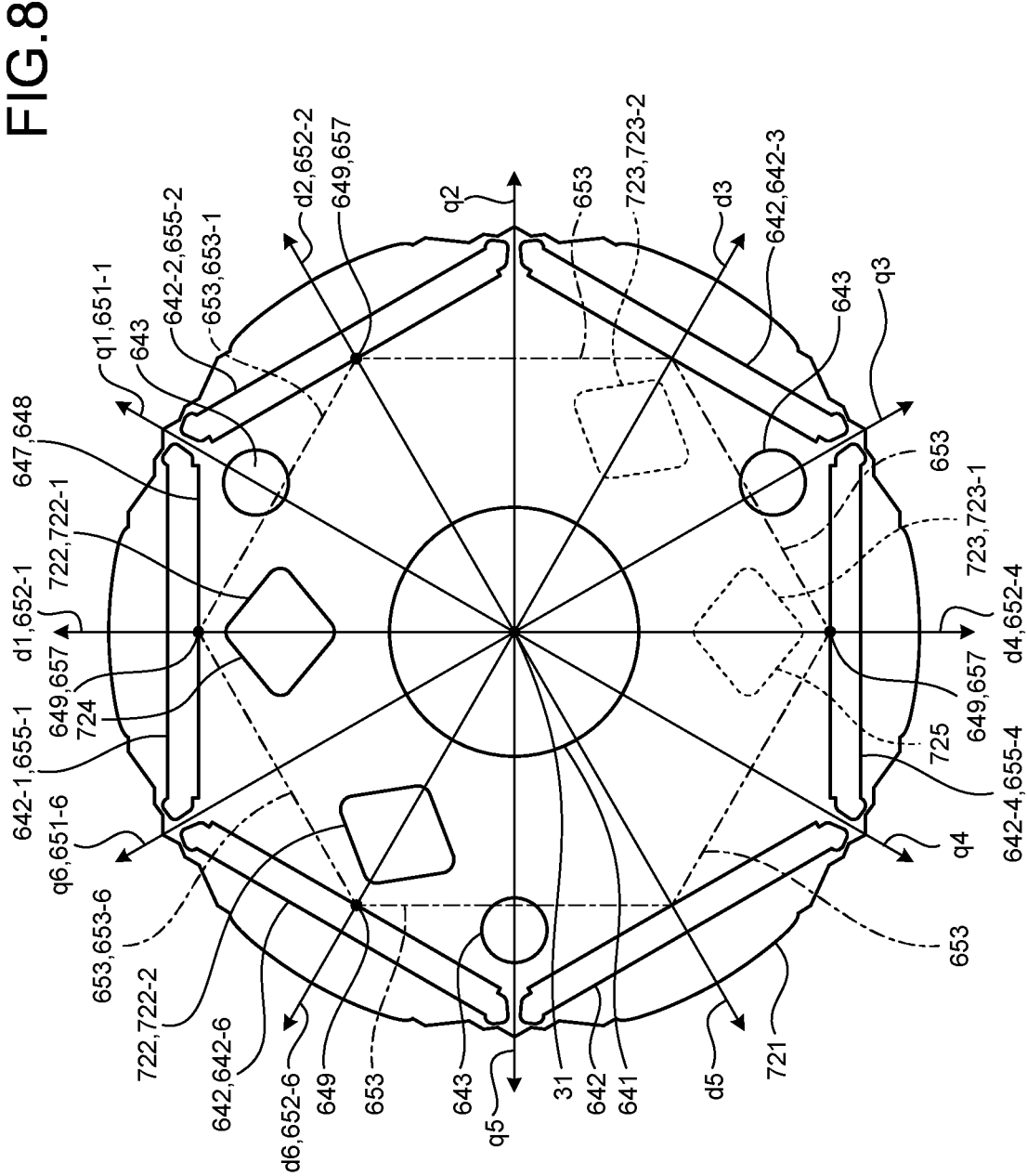
FIG. 8 is a top view of a rotor core of a compressor of a fourth embodiment.

A compressor of a fourth embodiment is configured such that, as illustrated in FIG. 8, the rotor core 701 of the compressor of the second embodiment as described above is replaced with a different rotor core 721, and other components are the same as those of the compressor of the second embodiment as described above. FIG. 8 is a top view of the rotor core 721 of the compressor of the fourth embodiment. The rotor core 721 is configured by replacing the plurality of upper-end-side eccentric holes 702 and the plurality of lower-end-side eccentric holes 703 of the rotor core 701 as described above with a plurality of different upper-end-side eccentric holes 722 and a plurality of different lower-end-side eccentric holes 723, and other components are the same as those of the rotor core 701 as described above.

Each of the upper-end-side eccentric holes 722 is formed parallel to the rotation axis 31 and formed in a hole that is recessed from the upper end surface 615 so as not to penetrate to the lower end surface 616, similarly to the plurality of upper-end-side eccentric holes 702. A first upper-end-side eccentric hole 722-1 among the plurality of upper-end-side eccentric holes 722 is formed on the inner peripheral side of the first magnet hole 642-1. The first upper-end-side eccentric hole 722-1 is formed such that a cross section perpendicular to the rotation axis 31 has an approximately diamond shape. An outer-peripheral-side inner wall surface 724, which is located on an outer peripheral side among inner wall surfaces of the first upper-end-side eccentric hole 722-1, is formed in the first upper-end-side eccentric hole 722-1. The outer-peripheral-side inner wall surface 724 is bent such that a portion (portion overlapping with the first d axis d1) that intersects with the first d-axis plane 652-1 on the outer-peripheral-side inner wall surface 724 is located closest to a plane side 8 (located on the most outer diameter side). Furthermore, the outer-peripheral-side inner wall surface 724 is bent so as to be located farther away from the side 648 with an increase in a distance from the first d-axis plane 652-1. A second upper-end-side eccentric hole 722-2 among the plurality of upper-end-side eccentric holes 722 is formed on the inner peripheral side of the sixth magnet hole 642-6, and is formed in the same manner as the first upper-end-side eccentric hole 722-1.

Each of the upper-end-side eccentric holes 722 is formed parallel to the rotation axis 31 and formed in a hole that is recessed from the upper end surface 615 so as not to penetrate to the lower end surface 616, similarly to the plurality of upper-end-side eccentric holes 702. A first upper-end-side eccentric hole 722-1 among the plurality of upper-end-side eccentric holes 722 is formed on the inner peripheral side of the first magnet hole 642-1. The first upper-end-side eccentric hole 722-1 is formed such that a cross section perpendicular to the rotation axis 31 has an approximately diamond shape. An outer-peripheral-side inner wall surface 724, which is located on an outer peripheral side among inner wall surfaces of the first upper-end-side eccentric hole 722-1, is formed in the first upper-end-side eccentric hole 722-1. The outer-peripheral-side inner wall surface 724 is bent such that a portion (portion overlapping with the first d axis d1) that intersects with the first d-axis plane 652-1 on the outer-peripheral-side inner wall surface 724 is located closest to a side 648 (located on the most outer diameter side). Furthermore, the outer-peripheral-side inner wall surface 724 is bent so as to be located farther away from the side 648 with an increase in a distance from the first d-axis plane 652-1. A second upper-end-side eccentric hole 722-2 among the plurality of upper-end-side eccentric holes 722 is formed on the inner peripheral side of the sixth magnet hole 642-6, and is formed in the same manner as the first upper-end-side eccentric hole 722-1.

The plurality of lower-end-side eccentric holes 723 are formed such that the plurality of lower-end-side eccentric holes 723 and the plurality of upper-end-side eccentric holes 722 are point symmetric with respect to the center point of the rotor core 721 in the top-bottom direction on the rotation axis 31. In other words, each of the lower-end-side eccentric holes 723 is formed parallel to the rotation axis 31 and formed in a hole that is recessed from the lower end surface 616 so as not to penetrate to the upper end surface 615. A first lower-end-side eccentric hole 723-1 among the plurality of lower-end-side eccentric holes 723 is formed on the inner peripheral side of the fourth magnet hole 642-4. The first lower-end-side eccentric hole 723-1 is formed such that a cross section perpendicular to the rotation axis 31 has an approximately diamond shape. An outer-peripheral-side inner wall surface 725, which is located on an outer peripheral side among inner wall surfaces of the first lower-end-side eccentric hole 723-1, is formed in the first lower-end-side eccentric hole 723-1. The outer-peripheral-side inner wall surface 725 is bent such that a portion (portion overlapping with fourth d axis d4) that intersects with the fourth d-axis plane 652-4 on the outer-peripheral-side inner wall surface 725 is located closest to the side 648 (located on the most outer diameter side). Furthermore, the outer-peripheral-side inner wall surface 724 is bent so as to be located farther away from the side 648 with an increase in a distance from the fourth d-axis plane 652-4. A second lower-end-side eccentric hole 723-2 among the plurality of lower-end-side eccentric holes 723 is formed on the inner peripheral side of the third magnet hole 642-3, and is formed in the same manner as the first lower-end-side eccentric hole 723-1.

In the compressor of the fourth embodiment, because the plurality of upper-end-side eccentric holes 722 and the plurality of lower-end-side eccentric holes 723 are arranged in the polygonal region 653, it is possible to reduce eccentricity of the rotating body and prevent reduction in the efficiency of the motor unit 6, similarly to the compressors of the first to the third embodiments.

Fifth Embodiment

Figure 9:
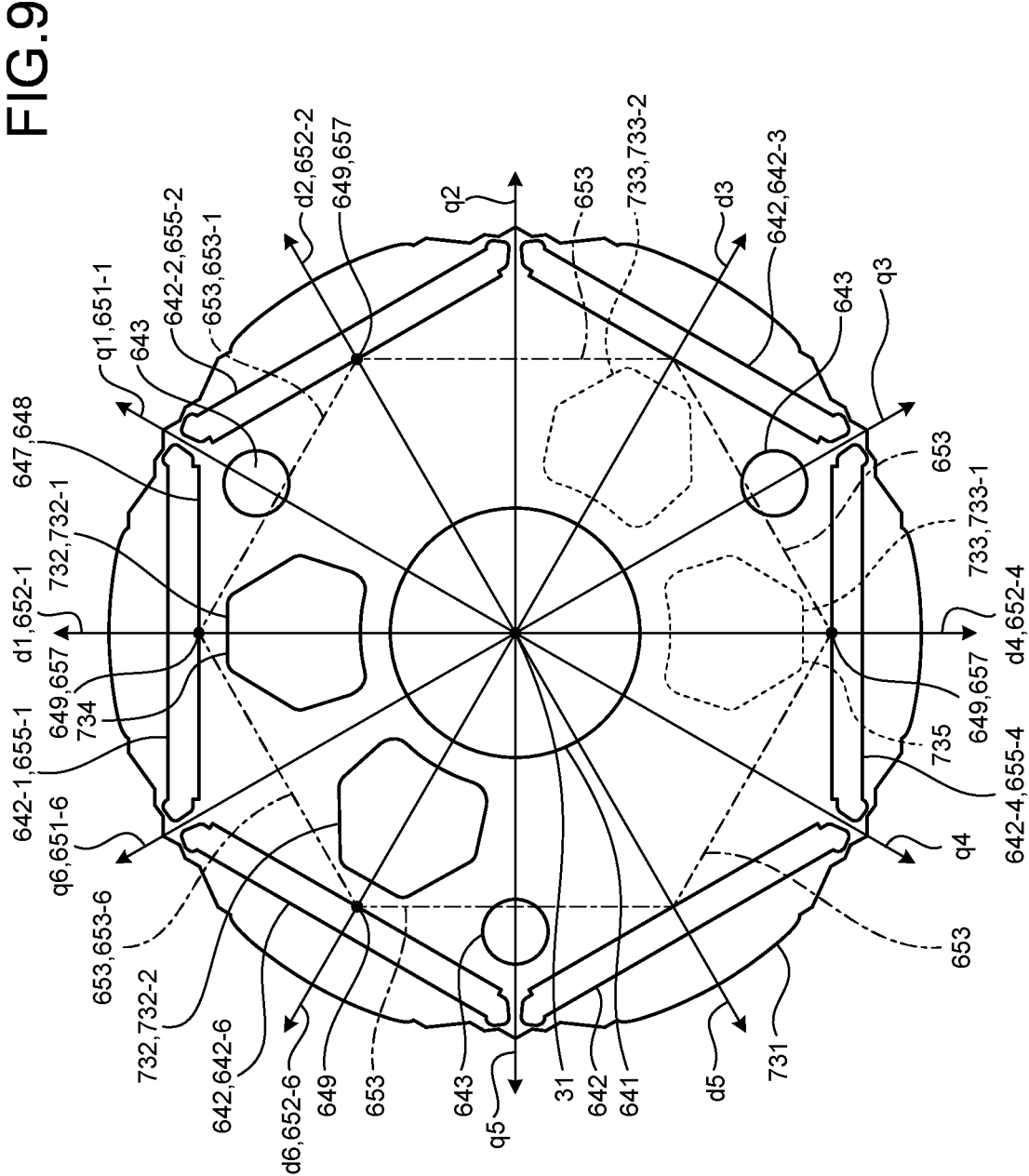
FIG. 9 is a top view of a rotor core of a compressor of a fifth embodiment.

While the outer-peripheral-side inner wall surfaces 704, 705, 714, 715, 724, and 725 of the plurality of upper-end-side eccentric holes and the plurality of lower-end-side eccentric holes of the compressors of the first to the third embodiments as described above are sharpened such that the central portions are located closest to the plurality of magnet holes 642, but the outer-peripheral-side inner wall surfaces need not always be sharpened. A compressor of a fifth embodiment is configured such that, as illustrated in FIG. 9, the rotor core 701 of the compressor of the second embodiment as described above is replaced with a different rotor core 731, and other components are the same as those of the compressor of the second embodiment as described above. FIG. 9 is a top view of the rotor core 731 of the compressor of the fifth embodiment. The rotor core 731 is configured by replacing the plurality of upper-end-side eccentric holes 702 and the plurality of lower-end-side eccentric holes 703 of the rotor core 701 as described above with a plurality of different upper-end-side eccentric holes 732 and a plurality of different lower-end-side eccentric holes 733, and other components are the same as those of the rotor core 701 as described above.

Each of the upper-end-side eccentric holes 732 is formed parallel to the rotation axis 31 and formed in a hole that is recessed from the upper end surface 615 so as not to penetrate to the lower end surface 616, similarly to the plurality of upper-end-side eccentric holes 702. A first upper-end-side eccentric hole 732-1 among the plurality of upper-end-side eccentric holes 732 is formed on the inner peripheral side of the first magnet hole 642-1. The first upper-end-side eccentric hole 732-1 is formed such that a cross section perpendicular to the rotation axis 31 has an approximately hexagonal shape. An outer-peripheral-side inner wall surface 734, which is located on an outer peripheral side among inner wall surfaces of the first upper-end-side eccentric hole 732-1, is formed in the first upper-end-side eccentric hole 732-1. The outer-peripheral-side inner wall surface 734 is formed so as to intersect with the first d-axis plane 652-1 and so as to be parallel to the side 648. A second upper-end-side eccentric hole 732-2 among the plurality of upper-end-side eccentric holes 732 is formed on the inner peripheral side of the sixth magnet hole 642-6, and is formed in the same manner as the first upper-end-side eccentric hole 732-1.

The plurality of lower-end-side eccentric holes 733 are formed such that the plurality of lower-end-side eccentric holes 733 and the plurality of upper-end-side eccentric holes 732 are point symmetric with respect to the center point of the rotor core 731 in the top-bottom direction on the rotation axis 31. In other words, each of the lower-end-side eccentric holes 733 is formed parallel to the rotation axis 31 and formed in a hole that is recessed from the lower end surface 616 so as not to penetrate to the upper end surface 615. A first lower-end-side eccentric hole 733-1 among the plurality of lower-end-side eccentric holes 733 is formed on the inner peripheral side of the fourth magnet hole 642-4. The first lower-end-side eccentric hole 733-1 is formed such that a cross section perpendicular to the rotation axis 31 has an approximately hexagonal shape. An outer-peripheral-side inner wall surface 735, which is located on an outer peripheral side among inner wall surfaces of the first lower-end-side eccentric hole 733-1, is formed in the first lower-end-side eccentric hole 733-1. The outer-peripheral-side inner wall surface 735 is formed so as to intersect with the fourth d-axis plane 652-4 and so as to be parallel to the side 648. A second lower-end-side eccentric hole 733-2 among the plurality of lower-end-side eccentric holes 733 is formed on an inner peripheral side of the third magnet hole 642-3, and is formed in the same manner as the first lower-end-side eccentric hole 733-1.

In the compressor of the fifth embodiment, because the plurality of upper-end-side eccentric holes 732 and the plurality of lower-end-side eccentric holes 733 are arranged on the inner peripheral side of the polygonal region 653, it is possible to reduce eccentricity of the rotating body and prevent reduction in the efficiency of the motor unit 6, similarly to the compressors of the first to the third embodiments.

Meanwhile, the plurality of upper-end-side eccentric holes and the plurality of lower-end-side eccentric holes of the compressors of the first to the fifth embodiments as described above are formed so as not to overlap with the plurality of q axes q1 to q6, but may overlap with the plurality of q axes q1 to q6. Even if the plurality of upper-end-side eccentric holes and the plurality of lower-end-side eccentric holes overlap with the plurality of q axes q1 to q6, because the plurality of upper-end-side eccentric holes and the plurality of lower-end-side eccentric holes are arranged on the inner side of the polygonal region 653, the compressor is able to reduce eccentricity of the rotating body and prevent reduction in the efficiency of the motor unit 6, similarly to the compressors of the first to the fifth embodiments as described above.

Meanwhile, the plurality of upper-end-side eccentric holes and the plurality of lower-end-side eccentric holes of the compressors of the first to the fifth embodiments as described above are formed so as to be plane symmetric with respect to the d-axis planes (line symmetric with respect to the d axes in the cross section perpendicular to the rotation axis), but may be formed so as to be asymmetric with respect to the d-axis planes. Even if the plurality of upper-end-side eccentric holes and the plurality of lower-end-side eccentric holes are asymmetric with respect to the d-axis planes, because the plurality of upper-end-side eccentric holes and the plurality of lower-end-side eccentric holes are arranged on the inner side of the polygonal region 653, the compressor is able to reduce eccentricity of the rotating body and prevent reduction in the efficiency of the motor unit 6, similarly to the compressors of the first to the fifth embodiments as described above.

Meanwhile, the plurality of upper-end-side eccentric holes and the plurality of lower-end-side eccentric holes of the compressors of the first to the fifth embodiments as described above are formed so as to overlap with the plurality of d axes d1 to d6, but may be formed so as not to overlap with the plurality of d axes d1 to d6. Even if the plurality of upper-end-side eccentric holes and the plurality of lower-end-side eccentric holes do not overlap with the plurality of d axes d1 to d6, because the plurality of upper-end-side eccentric holes and the plurality of lower-end-side eccentric holes are arranged on the inner side of the polygonal region 653, the compressor is able to reduce eccentricity of the rotating body and prevent reduction in the efficiency of the motor unit 6, similarly to the compressors of the first to the fifth embodiments as described above.

Meanwhile, the plurality of plate-shaped permanent magnets 655 of the compressors of the first to the fifth embodiments as described above are formed in rectangular solid shaped, but may be formed so as to bend in bow shapes. Even if the plurality of permanent magnets 655 are formed so as to bend, because the plurality of upper-end-side eccentric holes and the plurality of lower-end-side eccentric holes are arranged on the inner side of the polygonal region 653, the compressor is able to reduce eccentricity of the rotating body and prevent reduction in the efficiency of the motor unit 6, similarly to the compressors of the first to the fifth embodiments as described above.

While the embodiments have been described above, the embodiments are not limited by the contents as described above. Furthermore, components described above include one that can be easily thought of by a person skilled in the art, one that is practically identical, and one that is within an equivalent range. Moreover, the components as described above may be combined appropriately. Furthermore, within the scope not departing from the gist of the embodiment, various omission, replacement, and modifications of the components may be made.

REFERENCE SIGNS LIST 1 compressor
3 shaft
31 rotation axis
32 first eccentric portion
33 second eccentric portion
5 compression unit
51 first annular piston
52 second annular piston
62 stator
611 rotor core
612 upper end plate
613 lower end plate
614 rivets
615 upper end surface
616 lower end surface
641 shaft hole
642 magnet holes
643 rivet holes
644 upper-end-side eccentric holes
645 lower-end-side eccentric holes
648 side
649 midpoint (vertex)
653 polygonal region
655 permanent magnets
657 center point
658 inner-peripheral-side surface
701 rotor core
702 upper-end-side eccentric holes
703 lower-end-side eccentric holes
711 rotor core
712 upper-end-side eccentric holes
713 lower-end-side eccentric holes
721 rotor core
722 upper-end-side eccentric holes
723 lower-end-side eccentric holes
731 rotor core
732 upper-end-side eccentric holes
733 lower-end-side eccentric holes

What is claimed is:

1. A compressor comprising:
a shaft that is arranged along a rotation axis;
a compression unit that drives along with rotation of the shaft;
a rotor core that is fixed to the shaft;
a plurality of permanent magnets that are embedded inside the rotor core; and
a stator that causes the rotor core to rotate about the rotation axis, wherein
a plurality of eccentric holes for adjusting balance when the shaft rotates are formed in the rotor core,
the plurality of eccentric holes:
include a plurality of upper-end-side eccentric holes that allow a center-of-gravity of an upper-end-side portion of the rotor core to be biased toward one side in a radial direction, and a plurality of lower-end-side eccentric holes that allow a center-of-gravity of a lower-end-side portion of the rotor core to be biased toward the other side in the radial direction; and
are formed on an inner side of a polygonal region having, as a plurality of vertices, a plurality of points corresponding to the plurality of permanent magnets, wherein the plurality of points include a point corresponding to one permanent magnet which is a midpoint of an intersection line of a plane perpendicular to the rotation axis and a surface opposing the rotation axis among surfaces of the one permanent magnet, and
each of the plurality of eccentric holes is:
located closest to one vertex of the plurality of vertices; and
formed such that an outer-peripheral-side inner wall surface closest to the one vertex of an inner wall surface of each eccentric hole is bent along two sides of a plurality of sides of the polygonal region that are adjacent at the one vertex.

2. The compressor according to claim 1, wherein
the plurality of permanent magnets are formed in rectangular solid shapes
such that a perpendicular line that is extended from the rotation axis to the intersection line passes through the midpoint.

3. The compressor according to claim 2, wherein each eccentric hole is formed such that the outer-peripheral-side inner wall surface is located farther away from the two sides with an increase in a distance from the one vertex in a circumferential direction.

4. The compressor according to claim 3, wherein each eccentric hole is plane symmetric with respect to a plane that passes through the perpendicular line and the rotation axis.

5. The compressor according to claim 1, wherein
the plurality of eccentric holes are formed so as not to overlap with q axes, and
the q axes pass through the rotation axis and between two permanent magnets that are adjacent to each other in a circumferential direction among the plurality of permanent magnets.

6. A compressor comprising:
a shaft that is arranged along a rotation axis;
a compression unit that drives along with rotation of the shaft;
a rotor core that is fixed to the shaft;
a plurality of permanent magnets that are embedded inside the rotor core;
a stator that causes the rotor core to rotate about the rotation axis;
a plurality of rivet holes provided at a position between two adjacent permanent magnets among the plurality of permanent magnets; and
a plurality of eccentric holes for adjusting balance when the shaft rotates are formed in the rotor core, wherein
the plurality of eccentric holes are formed on an inner side of a polygonal region for which midpoints of sides at a side of the rotation axis among sides formed by side surfaces of the plurality of permanent magnets in a cross section perpendicular to the rotation axis serve as vertices.

7. The compressor according to claim 6, wherein
the plurality of eccentric holes include a plurality of upper-end-side eccentric holes and a plurality of lower-end-side eccentric holes, and
the plurality of eccentric holes include two adjacent eccentric holes that are respectively arranged at a mid-point position of the two adjacent permanent magnets.

8. A compressor comprising:
a shaft that is arranged along a rotation axis;
a compression unit that drives along with rotation of the shaft;
a rotor core that is fixed to the shaft;

a plurality of permanent magnets that are embedded inside the rotor core;

a stator that causes the rotor core to rotate about the rotation axis; and a plurality of eccentric holes that partially extend through the rotor core and are configured to adjust balance when the shaft rotates, wherein the plurality of eccentric holes are formed on an inner side of a polygonal region for which midpoints of sides at a side of the rotation axis among sides formed by side surfaces of the plurality of permanent magnets in a cross section perpendicular to the rotation axis serve as vertices.

9. The compressor according to claim 8, wherein the plurality of eccentric holes include a plurality of upper-end-side eccentric holes and a plurality of lower-end-side eccentric holes, and the plurality of eccentric holes include two adjacent eccentric holes that are respectively arranged at a mid-point position of two adjacent permanent magnets among the plurality of permanent magnets.

\* \* \* \* \*